United States Patent
Albrecht et al.

(10) Patent No.: US 6,285,701 B1
(45) Date of Patent: Sep. 4, 2001

(54) LASER RESONATOR FOR IMPROVING NARROW BAND EMISSION OF AN EXCIMER LASER

(75) Inventors: Hans-Stephan Albrecht, Göttingen; Peter Heist, Jena; Klaus Wolfgang Volger, Göttingen, all of (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/130,277

(22) Filed: Aug. 6, 1998

(51) Int. Cl.[7] .............................. H01S 3/098; H01S 3/10; H01S 3/22; H01S 3/08
(52) U.S. Cl. .............................. 372/57; 372/19; 372/20; 372/92; 372/98
(58) Field of Search ................................ 372/57, 19, 20, 372/92, 98, 100, 102

(56) References Cited

U.S. PATENT DOCUMENTS

| | | | |
|---|---|---|---|
| 3,899,750 | 8/1975 | Hochuli | 331/94.5 |
| 4,156,209 | 5/1979 | Herbst et al. | 331/94.5 |
| 4,360,925 | 11/1982 | Brosnan et al. | 372/9 |
| 4,429,392 | 1/1984 | Yoshida et al. | 372/9 |
| 4,477,909 | 10/1984 | Salvi et al. | 372/95 |
| 4,740,982 | 4/1988 | Hakuta et al. | 372/59 |
| 4,829,536 | 5/1989 | Kajiyama et al. | 372/57 |
| 4,873,692 | 10/1989 | Johnson et al. | 372/20 |
| 4,918,704 | 4/1990 | Caprara et al. | 372/99 |
| 4,977,573 | 12/1990 | Bittenson et al. | 372/81 |
| 5,090,020 | 2/1992 | Bedwell | 372/59 |
| 5,095,492 | 3/1992 | Sandstrom | 372/102 |
| 5,150,370 | 9/1992 | Furuya et al. | 372/106 |
| 5,377,215 | 12/1994 | Das et al. | 372/57 |
| 5,404,366 | 4/1995 | Wakabayashi et al. | 372/29 |
| 5,440,578 | 8/1995 | Sandstrom | 372/59 |
| 5,450,436 | 9/1995 | Mizoguchi et al. | 372/59 |
| 5,559,816 | 9/1996 | Basting et al. | 372/27 |
| 5,596,596 * | 1/1997 | Wakabayashi et al. | 372/102 |
| 5,642,374 | 6/1997 | Wakabayashi et al. | 372/57 |
| 5,646,954 | 7/1997 | Das et al. | 372/55 |
| 5,657,334 | 8/1997 | Das et al. | 372/33 |
| 5,684,822 | 11/1997 | Partlo | 372/95 |
| 5,748,316 | 5/1998 | Wakabayashi et al. | 356/352 |
| 5,946,337 | 8/1999 | Govorkov et al. | 372/92 |
| 5,970,082 * | 10/1999 | Ershov | 372/10 |
| 6,028,879 * | 2/2000 | Ershov | 372/57 |

FOREIGN PATENT DOCUMENTS

| | | | |
|---|---|---|---|
| 0 472 727 A1 | 3/1992 | (EP) | H01S/3/1055 |
| WO 96/16455 | 5/1996 | (WO) | 3/8 |

OTHER PUBLICATIONS

PCT International Application No. WO 96/16455, filed May 30, 1996.

(List continued on next page.)

Primary Examiner—Robert H. Kim
Assistant Examiner—Armando Rodriguez
(74) Attorney, Agent, or Firm—Sierra Patent Group, Ltd.; Andrew V. Smith

(57) ABSTRACT

An apparatus and method are provided for bandwidth narrowing of an excimer laser to $\Delta\lambda \approx 6$ pm or less with high spectral purity and minimized output power loss. Output stability with respect to pulse energy, beam pointing, beam size and beam output location is also provided. The excimer laser includes an active laser medium for generating a spectral beam at an original wavelength, means for selecting and narrowing the broadband output spectrum of the excimer laser, a resonator having at least one highly reflecting surface, and an output coupler. Means for adapting a divergence of the resonating band within the resonator is further included in the apparatus of the invention. The divergence adapting causes the spectral purity to improve by between 20% and 50% and the output power to reduce by less than 10%. A method according to the invention includes selecting and aligning the divergence adapting means.

48 Claims, 4 Drawing Sheets

OTHER PUBLICATIONS

Press Release, entitled: Fort Lauderdale, Florida, "Lambda Physik Shows Readiness For The Future Challenges of Microlithography", Dec., 1997.

Proceedings, SPIE—The International Society for: Optical Engineering, "Optical/Laser Microlithography III", Victor Pol, Chair/Editor, Mar. 7–9, 1990, vol. 1264.

Technical World Briefs, News & Analysis, "Laser Could Extend Optical Lithography Into VUV", Jan. 1998.

Applied Optics, "Lasers, Photonics, and Environmental Optics", Jan. 20, 1992, vol. 31, No. 3.

"Lambda Physik Shows Readiness for the Future Challenges of Microlithography", Press Release, Dec. 1997.

"Measurements of Beam Characteristics relevant to DUV Microlithography on a KrF Excimer Laser", Optical/Laser Microlithography III, R.L. Sandstrom, International Society for Optical Engineering, Mar. 7–9, 1990.

"Spatial Coherence of KrF Excimer Lasers", Applied Optics, vol. 31, No. 3, S. Alta, I. Hikima, Y. Ichihara, and S. Watanabe, Jan. 20, 1992.

"Injection–Locking Unstable Resonator Excimer Lasers", IEEE Journal of Quantum Electronics, vol. QE–19, No. 9, I.J. Bigio and M. Slatkine, Sep. 1983.

"Laser Could Extend Optical Lithography into VUV", Photonics Spectra, p. 48, Jan. 1998.

"Preionization and Discharge Stability Study of Long Optical Pulse Duration UV–Preionized XeCl Lasers", Applied Physics B, vol. B 41, No. 1, R.S. Taylor, Sep. 1986.

\* cited by examiner

LASER RESONATOR FOR IMPROVING NARROW BAND EMISSION OF AN EXCIMER LASER

BACKGROUND OF THE INVENTION

1. Field of the Invention

The invention relates to a resonator designed for narrow-linewidth emission, and particularly to a resonator for an excimer laser having optical components for improving spectral purity, reducing spectral bandwidth and optimizing output power for emitting a high resolution photolithographic beam.

2. Discussion of the Related Art

To increase the capacities and operation speeds of integrated circuits, manufacturers are inclined to design smaller internal structures for devices and other components of these chips. The reduction in size of a structure produced on a silicon wafer is limited by the ability to optically resolve the structure. This resolution ability depends directly upon the photolithographical source radiation and optics used.

Excimer lasers emitting pulsed UV-radiation are becoming increasingly important instruments in specialized material processing. The term "excimer" was first utilized as an abbreviation for "excited dimer", meaning two or more identical atoms comprising a molecule which only exists in an excited state, such as $He_2$ and $Xe_2$. Today, the term "excimer" has a broader meaning in the laser world and encompasses such rare gas halides as XeCl (308 nm), KrF (248 nm), ArF (193 nm), KrCl (222 nm), and XeF (351 nm). Several mercury-halides are also used as active gases in excimer lasers, such as HgBr. Even $N_2$, $N_2^+$, $CO_2$ and $F_2$ (157 nm) may be used as active media within excimer laser discharge chambers. As is apparent, many excimer lasers radiate at ultraviolet wavelengths making them desirable for use as lithography tools. The KrF-excimer laser emitting around 248 nm and the ArF-excimer laser emitting around 193 nm are rapidly becoming the light sources of choice for photolithographic processing of integrated circuit devices (IC's). The $F_2$-laser is also being developed for such usage and emits light around 157 nm.

To produce smaller feature sizes on IC chips, stepper and scanner machines are using expensive large scale submicron projection objectives for imaging a reticle onto a wafer surface with high diffracting-limited precision. The objectives operate at deep ultraviolet (DUV) wavelengths, such as the emission wavelengths of excimer lasers. For example, the KrF-excimer laser emitting around 248 nm is currently being used as a DUV radiation source. To reach greater resolution limits, the large field objective lenses are designed and optimized in view of various possible and discovered imaging errors. The design optimization of the objectives is, however, inadequate to meet the precision demands of sub-quarter micron lithographic technology.

One way to improve the resolvability of structures on IC chips is to use more nearly monochromatic source radiation, i.e., radiation having a reduced bandwidth, $\Delta\lambda$. Other strategies include using shorter absolute wavelength, $\lambda$, radiation such as that emitted around 193 nm and 157 nm by ArF- and $F_2$-lasers, respectively, and increasing the numerical aperture (NA) of the projection lens.

The smallest structure resolvable on an IC chip depends on the "critical dimension" (CD) of the photolithography equipment being used:

$$CD = K_1 \cdot \frac{\lambda}{NA}; \text{ where}$$

NA is a measure of the acceptance angle of the projection lens, $\lambda$ is the wavelength of the source radiation, and $K_1$ is a constant around approximately 0.6–0.8. Simply increasing the numerical aperture NA to reduce the critical dimension CD simultaneously reduces the depth of focus DOF of the projection lens by the second power of NA:

$$DOF = K_2 \cdot \frac{\lambda}{(NA)^2}; \text{ where}$$

$K_2$ is a constant around approximately 0.8–1.0. This complicates wafer adjustment and adds further strain on the demand for improved chromatic correction of the projection lenses. Additionally, increasing the numerical aperture NA to reduce the critical dimension CD for achieving smaller structures requires a decrease in the bandwidth $\Delta\lambda$ of laser emission according to:

$$\Delta\lambda = K_3 \cdot \frac{\lambda}{(NA)^2}; \text{ where}$$

$K_3$ is a constant dependent on parameters associated with the projection lens(es). Each of the above assumes that such other laser parameters as repetition rate, stability, and output power remain constant.

Some techniques are known for selecting and for narrowing laser emission bandwidths including using optically dispersive elements such as etalons, gratings and prisms, as well as modified resonator arrangements. See U.S. Pat. No. 5,095,492 to Sandstrom (disclosing a dispersive grating having a concave radius of curvature); U.S. Pat. No. 5,559,816 to Basting et al. (disclosing a technique using the polarization properties of light); U.S. Pat. No. 5,150,370 to Furuya et al. (disclosing a fabry-perot etalon within the laser resonator); U.S. Pat. No. 5,404,366, U.S. Pat. No. 5,596,596 and E.U. Patent Pub. No. 0 472 727, each to Wakabayashi et al. (disclosing a concave outcoupler and a fixed aperture within the laser resonator); U.S. Pat. No. 4,829,536 to Kajiyama et al. (disclosing angularly offset etalons).

Using this available knowledge, the bandwidth of laser emission, e.g., which is naturally around 500 pm for a KrF-excimer laser, can be reduced to $\Delta\lambda \approx 0.8$ pm, sufficient to meet the demands of current projection lenses (NA$\approx$0.53) for producing quarter micron ship structures. Further improvements in projection objectives (NA$\approx$0.8) combined with a further reduction in laser emission bandwidths ($\Delta\lambda \approx 0.4$–0.6 pm) are expected to reduce the critical dimension CD using KrF-excimer laser sources down to CD$\approx$0.18 microns. See J. Mulkens et al., Step and Scan Technology for the 193 nm Era, Third International Symposium on 193 nm Lithography, Onuma, Japan (Jun. 29–Jul. 2, 1997).

The drawback to this significant bandwidth and CD reduction is a correspondingly significant reduction in available laser output power. Narrow band efficiencies of twenty to forty percent of broadband output power are typical. There is thus a need for efficient spectral narrowing methods which minimize power loss.

FIG. 1 shows a conventional excimer laser arrangement. A laser tube 1 contains a laser active medium (not shown) for emitting a characteristic wavelength upon excitation pumping of the laser active medium. A wavelength selection and narrowing assembly 2 includes a dispersive grating 3 and at least one expanding and/or dispersive prism 4. The grating 3 also serves to reflect substantially all of the laser light incident upon it at a wavelength dependent angle. A narrow band of the light dispersed once through the prism 4 and incident upon the grating 3 is reflected off of the grating 3 and back along the optical path of the arrangement, while all other wavelengths are reflected away from the optical path. The arrangement is completed with an output coupling mirror 5 which reflects a portion of the resonating band and allows the rest to continue unreflected ultimately defining the output beam of the system.

The excimer laser arrangement of FIG. 2 includes all of the elements of FIG. 1 except the output coupling mirror 5, and further includes a beam splitter 6 and a highly reflective mirror 8. The beam splitter 6 serves as an output coupler reflecting the narrow band laser emission 9 from the optical path of the resonating beam. A highly reflective mirror 8 is used instead of the partially reflecting output coupling mirror 5 of the arrangement of FIG. 1.

SUMMARY OF THE INVENTION

The present invention sets forth an apparatus and method for bandwidth narrowing of an excimer laser to $\Delta\lambda \approx 0.6$ pm or less with high spectral purity and minimized output power loss. Additional and/or modified optical elements within the laser resonator are used. Output stability with respect to pulse energy, beam pointing, beam size and beam output location are also improvements of the present invention.

An apparatus according to the present invention is an excimer laser including an active laser medium for generating a broadband spectral beam at an original wavelength, means for narrowing the wavelength and/or selecting a spectral line of the generated broadband spectral beam, a resonator and a means for outcoupling the resonating band. Means for adapting or matching the divergence of the intracavity rays is further included in the apparatus according to the present invention for optimizing the combination of output power, spectral purity and bandwidth of the output beam of the excimer laser. A method according to the present invention includes selecting and aligning the divergence adapting or matching means such that the combination of output power, spectral purity and bandwidth of the output beam of the excimer laser is optimized.

DETAILED DESCRIPTION OF THE PREFERRED EMBODIMENT

Figure 1:
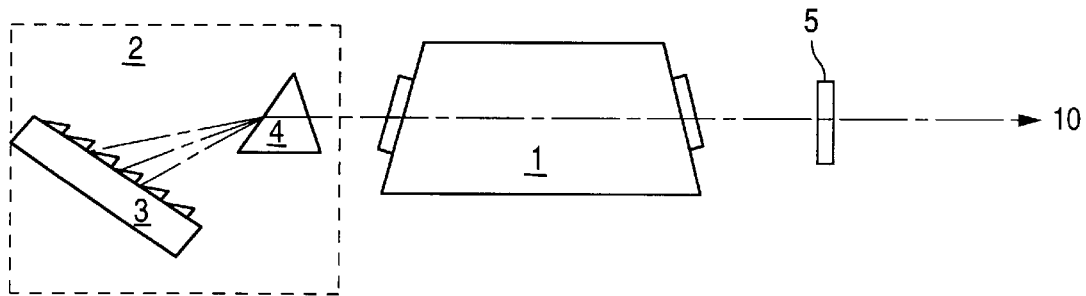
FIG. 1 shows a conventional excimer laser arrangement including output coupling via a partially reflective resonator mirror.
Figure 2:
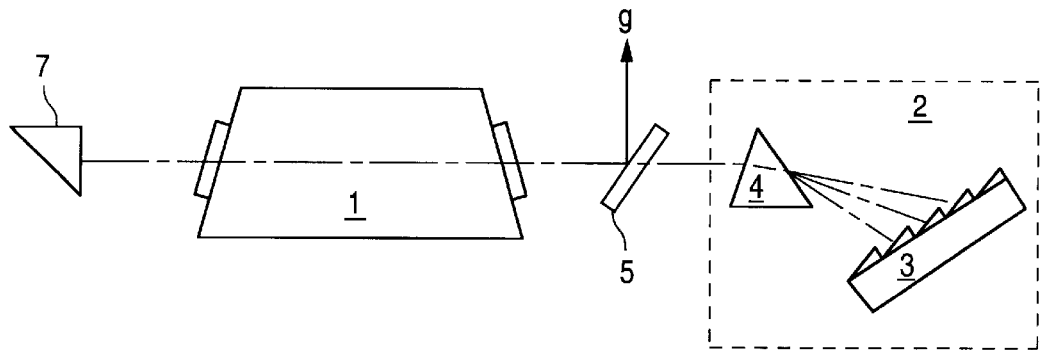
FIG. 2 shows a conventional excimer laser arrangement including a phase retardation prism and output coupling via a beam splitter.

Spectral laser emissions propagate with a full-angle of beam divergence after n round trips within the resonator of an excimer laser approximately according to:

$$\theta_0 \approx \frac{4a}{L\sqrt{n}}; \text{ where}$$

a is the aperture radius (or its geometrical equivalent corresponding to the geometry of the aperture), L is the length of the resonator, and n is the number of round trips an average photon emitted from the laser active medium traverses within the resonator before outcoupling through, e.g., the outcoupling mirror 5 of the arrangement of FIG. 1, or the beam splitter 6A of the arrangement of FIG. 2. See S. Kawata, I. Hikima, Y. Ichihara, and S. Watanabe, Spatial Coherence of KrF Excimer Lasers, Appl. Opt., vol. 31, page 387 (1992). When dispersive elements are used for wavelength narrowing, the angular divergence corresponds to a finite bandwidth:

$$\theta_0 \sim \Delta\lambda_0.$$

Different parts of the lateral laser beam comprise different spectral portions of the spectrally narrowed beam. See R. Sandstrom, Measurements of Beam Characteristics Relevant to DUV Microlithography on a KrF Excimer Laser, SPIE: Microlithography III, vol. 1264, 505, 511 (1990) (showing in FIG. 8 the variation in spectral content of a previously horizontally dispersed beam as a vertical slit mask selects out portions of the beam, scanning horizontally from beam center to the right). The side wings, or outer wavelengths, of the spectral band of the excimer laser contain a significant amount of energy which cannot be ignored due to its effect of diminishing the spectral purity and output power of the output beam. See Sandstrom (above), at 507-11. These side wings also contribute to the width of the band.

Furthermore, spectral narrowing generally occurs in any laser resonator according to the spectral narrowing effect:

$$\Delta\lambda_L = \frac{\Delta\lambda_0}{\sqrt{n}}; \text{ where}$$

n is the number of round trips, $\Delta\lambda_0$ is the bandwidth narrowed by optical components within the resonator, and $\Delta\lambda_L$ is the laser emission bandwidth. Effective spectral narrowing of a laser beam typically requires a large number n of round trips. Since an excimer laser usually has a few round trips, the natural spectral narrowing associated with other types of lasers is not achieved. Further, in an excimer laser, the side wings are amplified at the expense of the center of the band, since they are within the divergence/acceptance angle of the beam during the few round trips traversed by the beam within the resonator.

At a given dispersive power, the degree of divergence compensation has to be carefully adapted to the number of round trips, since they, together with the resulting bandwidth, spectral purity and output power of the emitted beam, are interdependent. Spectral purity is a measure of the spectral energy distribution within a narrow central region around the line center, e.g., within a 2 pm limit. The spectral purity may also be defined as the energy within a specified wavelength interval divided by the total energy.

Figure 3:
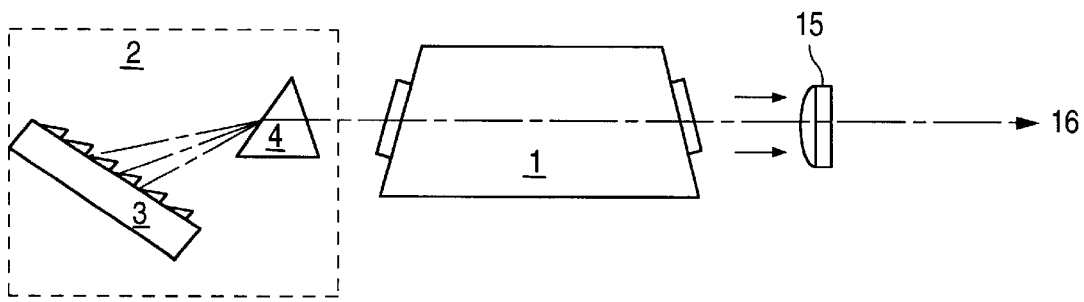
FIG. 3 shows an excimer laser arrangement according to a first embodiment of the present invention.

FIG. 3 shows an arrangement of a resonator of an excimer laser in accordance with a first embodiment of the present invention. The arrangement includes an active laser medium 1 for emitting light having a characteristic wavelength. The arrangement further includes wavelength selecting and narrowing optics 2 comprising a grating 3 and at least one prism 4. The grating 3 serves as one of the two reflecting resonator surfaces of the first embodiment. The grating 3 reflects substantially all light incident upon it, each wavelength at a different angle. The other reflecting surface is a convex-curved, preferably cylindrical, surface of an output coupling mirror 15. The output coupler 15 preferably transmits a portion of the light incident upon it and reflects the rest. Alternatively, the outermost radial portion of the resonating band simply misses the output coupling mirror 15, which has a smaller radius than the resonating beam at that point. In either event or in another conventional way, the portion of the resonating band that exits the resonator along the predetermined optical path after encountering the output coupling mirror 15 defines the emitted output beam 16 of the laser. The resonator may thus be operated as an unstable resonator, or alternatively, additional optics may be used to stabilize the resonator.

As mentioned above, the lateral laser beam comprises a spectrum of wavelengths, ordered according to wavelength, as an effect of traversing the wavelength selection and narrowing optics 2. The optics of the arrangement of the first embodiment are aligned such that the center of the resonating band strikes approximately at the center of the mirror 15. That center portion is reflected back along the optical path of the resonator.

Other wavelengths above and below the center of the band, are reflected off the mirror 15 at angles away from the optical path wherein these angles are enhanced due to the convex nature of the mirror 15. Wavelengths that are sufficiently removed from the center of the band are reflected at such a high angle that they no longer are accepted by apertures within the resonator, such as those surrounding the laser active medium 1. These wavelengths will not be part of any subsequently emitted output beam 16. Since a smaller geometrical region of the resonating beam will be accepted by natural apertures of the resonator, the resonating band of the first embodiment comprises a narrower range of wavelengths than a resonating band of a conventional resonator.

The resonator of the first embodiment is an unstable resonator if a light ray initially propagating parallel to the optical axis of the laser cavity could not be reflected back between the two mirrored surfaces 3 and 15 indefinitely without escaping from between the mirrors 3 and 15, other than by outcoupling. That is, the angle a ray of the resonating beam makes with the optical axis will increase with the number of round trips the ray makes within the resonator. If the grating 3 is flat and no additional focusing optics are provided in the arrangement of the first embodiment, then the first embodiment will include an unstable resonator by virtue of the convex output coupler 15.

The angle of a light ray incident upon the output coupler 15 over which this light reflected from the outcoupling mirror 15 is dispersed out of the resonating beam is the acceptance angle of the beam. The smaller the radius of curvature of the convex outcoupling mirror 15, the smaller the acceptance angle of the beam. Consequently, the smaller the radius of curvature of the outcoupling mirror 15, the narrower the band of wavelengths that the ultimate emitted beam 16 will comprise. The radius of curvature is preferably constant over the surface of the mirror 15, but may change with distance from the center, or along a diameter. The focal length of the mirror 15 is preferably in the range of several meters, as are most curved components of the present invention.

The narrowing of the beam 16 is not achieved without a price. Generally, with all else being the same, the narrower the bandwidth of the beam, the weaker the output power of that beam 16. At some point, the beam 16 can be so narrowed that its output power is not sufficient to perform adequate lithography. However, the radius of curvature of the convex mirror 15 can be selected appropriately, such that the output power of the beam 16 is sufficient, while the desired bandwidth narrowing is achieved.

Thus, a first advantage of the first embodiment over a conventional arrangement having a, e.g., flat outcoupling mirror 5, such as that of FIG. 1, is that the spectral purity of the beam 16 of the first embodiment is enhanced over the prior art. A second advantage is that the bandwidth of the beam may be more greatly narrowed than a prior art beam while maintaining adequate output power, since the side wings of the resonating beam are dispersed out by the outcoupling mirror 16 and do not absorb power being amplified. Available power is then focusable on amplifying a more useful narrow central portion of the emission band 16. In a preferred embodiment, the radius of curvature of the outcoupling mirror 15 is adjustable to optimize the combination of output power, bandwidth and spectral purity of the emitted beam 16.

The present invention is capable of improving spectral purity by between 20% and 50%, or more while power loss is kept to less than 10%. Power loss may be defined as the difference between the power of a state of the art laser and the power of a laser according to the present invention, divided by the power of a state of the art laser. Typical line narrowing efficiency is between 0.2 and 0.4, and particularly is around 0.3 for lasers used in lithography.

Figure 4:
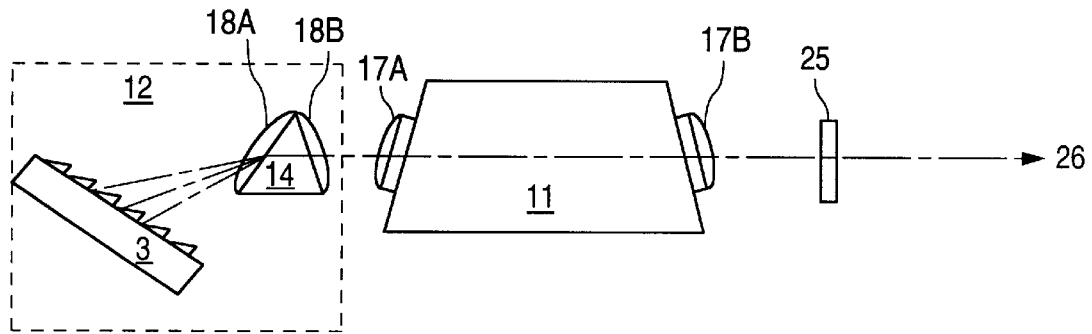
FIG. 4 shows an excimer laser arrangement according to a second embodiment of the present invention.

FIG. 4 shows an arrangement of a resonator of an excimer laser in accordance with a second embodiment of the present invention. The second embodiment has an active laser medium 11, wavelength selection and narrowing optics 12 including a grating 3, which preferably serves also as one of two reflecting surfaces of the resonator, and at least one prism 14, and an output coupler 25. A highly reflective mirror may alternatively perform the reflective function of the grating 3. The output coupler 25 may be similar to the conventional output coupler 5 of FIG. 1, or it may be similar to the output coupler 15 having a reflecting surface with a convex radius of curvature of FIG. 3, or may be another operable output coupler 25.

The laser active medium 11 is contained within a housing having a first optical window 17A and a second optical window 17B to facilitate entrance and exit of the resonating beam. The windows 17A and 17B each comprise one or more conventionally UV transparent materials such as crystalline quartz, $CaF_2$ and/or $MgF_2$, for example.

At least one surface of at least one, and preferably both, windows 17a and 17B is curved. Both surfaces of one or both windows 17A and 17B may be curved, but preferably only the outer surfaces are curved as shown in FIG. 4. The effective total radius of curvature of all curved surfaces of the windows 17A and 17B is selected to match or adapt the divergence of the resonating beam and optimize the combination of laser output power, bandwidth and spectral purity. By matching or adapting the divergence of the resonating beam, the angles of light rays of the resonating beam relative to the optical axis are changed to minimize the angle of the light rays relative to the optical axis. The divergence is matched or adapted in the present invention to optimize spectral purity and bandwidth. Divergence adapting is provided in the present invention by focusing elements and/or by the cutting of rays with an angle relative to the optical axis greater than a specified angle by one or more apertures.

The prism 14 of the second embodiment has a first curved surface 18A and a second curved surface 18B through which the resonating beam enters and exits the prism 14. Alternatively, only one surface 18A or 18B may be curved. Another arrangement of the wavelength narrowing and selection optics 12 is possible wherein the resonating beam enters and exits the prism through the same curved surface. The curvature of each surface 18A and 18B is preferably convex. Alternatively, one may be concave or the radius of curvature may change with position on one or both surfaces 18A and 18B.

A first advantage of the second embodiment over a conventional arrangement such as that shown in FIG. 1 is that the radius of curvature of each of the surfaces 17A, 17B, 18A and 18B may be selected to match the divergence of the laser beam, and optimize output power, bandwidth and spectral purity. A second advantage is that the surfaces 18A and 18B of the prism 14 and/or the surfaces 17A and 17B of the housing containing the active laser medium 11 may be used to expand or narrow the resonating beam, depending on what is needed in the arrangement considering the properties and alignment of the other optics in the arrangement.

Figure 5A:
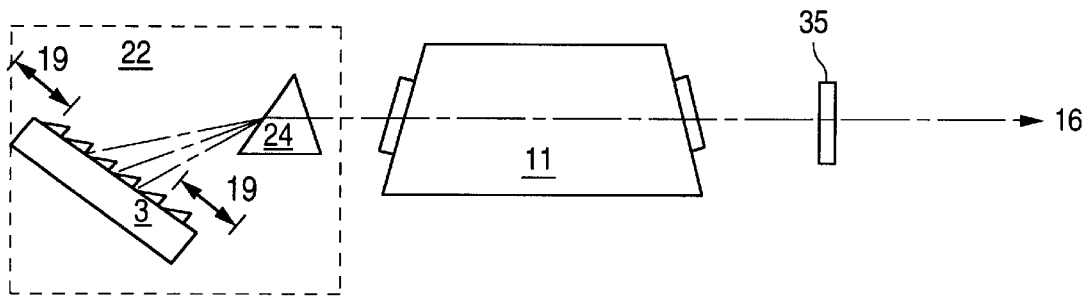
FIG. 5A shows an excimer laser arrangement according to a third embodiment of the present invention.

FIG. 5A shows an arrangement of a resonator of an excimer laser in accordance with a third embodiment of the present invention. The third embodiment includes an active laser medium 21, wavelength selection and narrowing optics 22 including a grating 3, which preferably serves also as one of two reflecting surfaces of the resonator, and at least one prism 24, and an output coupler 35. A highly reflective mirror may alternatively perform the reflective function of the grating 3. The output coupler 35 may be similar to the conventional output coupler 5 of FIG. 1, or it may be similar to the output coupler 15 having a reflecting surface with a convex radius of curvature of FIG. 3, or may be another operable output coupler 35. An output beam 16 is transmitted past the output coupler 35. The prism 24 and housing of the active laser medium 21 may be configured as in the either of the first or the second embodiments of FIGS. 3 and 4, respectively, or otherwise conventionally.

The third embodiment also includes an aperture 19 located within the resonator arrangement of FIG. 5A. The aperture 19 is preferably located near the grating 3 as shown in FIG. 5A, but may be located at various locations along the optical path of the resonating beam. More than one aperture may be placed along the optical path of the resonating band. The aperture 19 is preferably adjustable to optimize the combination of the output power, the bandwidth and the spectral purity of the output beam 16. The aperture 19 is blocking highly divergent beams, i.e., beams having a large angle relative to the optical axis of the resonator, primarily to improve spectral purity. When the aperture 19 is located close to the grating 3, the output power is not significantly affected by the presence of the aperture 19. An advantage of the third embodiment is that the spectral purity, bandwidth and output power of the output beam 16 are optimized over those of a conventional arrangement such as that described in FIG. 1.

Figure 5B:
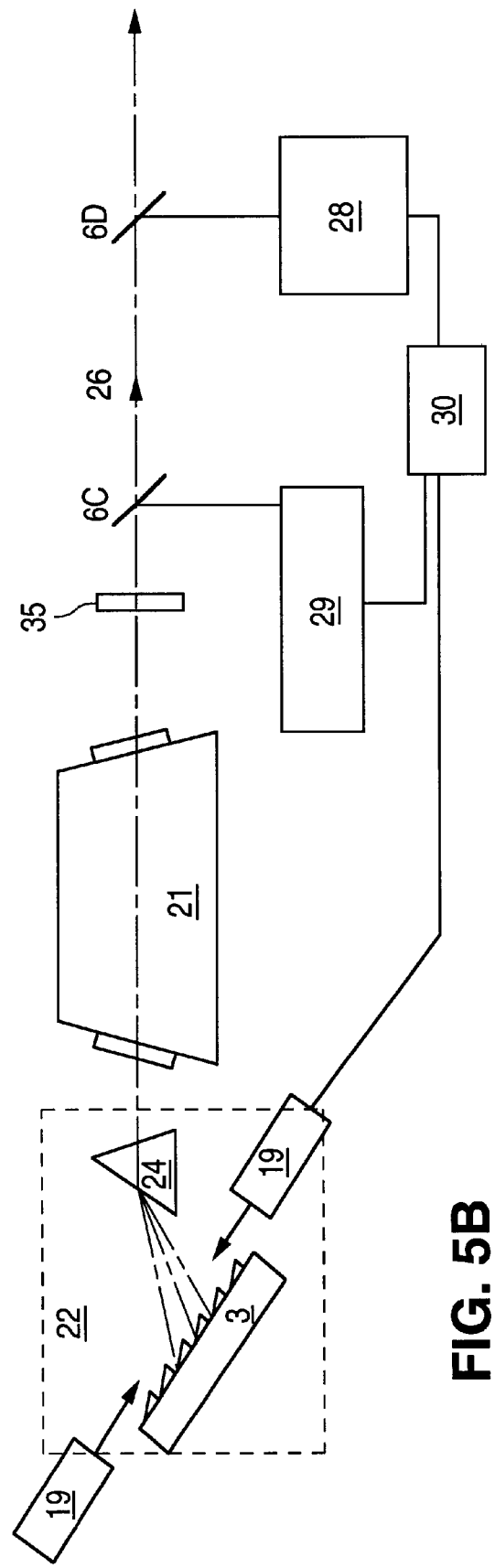
FIG. 5B shows an excimer laser arrangement according to a fourth embodiment of the present invention.

FIG. 5B shows an arrangement of a resonator of an excimer laser in accordance with a fourth embodiment of the present invention. The fourth embodiment of FIG. 5B includes all of the elements of the third embodiment of FIG. 5A. Additionally, the fourth embodiment includes a beam splitter 6C after the output coupler 35 which transmits an output beam 26 and reflects a portion of the output of the output coupler 35. The reflected portion is received by a high resolution spectrometer 29 for determining the wavelength and waveform characteristics of the output beam 26. A second beam splitter 6D is inserted to direct a portion of the output beam 26 toward an energy detector 28. The outputs of each of the detector 28 and the spectrometer 29 are received by a computer 30 and processed. The computer then determines how the optics of the arrangement should be modified to optimize the laser output 26 with regard to the combination of output power, bandwidth and spectral purity. The optics may then be manually or automatically adjusted in accordance with the computer's instructions/suggestions. Particularly with respect to the fourth embodiment, the aperture size may be modified. Generally, the detector 28, the high resolution spectrometer 29 and the computer 30 may be used with any of the embodiments of the present invention to help achieve the task of optimizing the combination of the output power, the bandwidth and the spectral purity of the output beam, e.g., 26. Alternatively with respect to the fourth embodiment, a feed back circuit may be used for real time monitoring of the bandwidth, output power and spectral purity of the output beam 26 and adjustment of the aperture 19.

Figure 6:
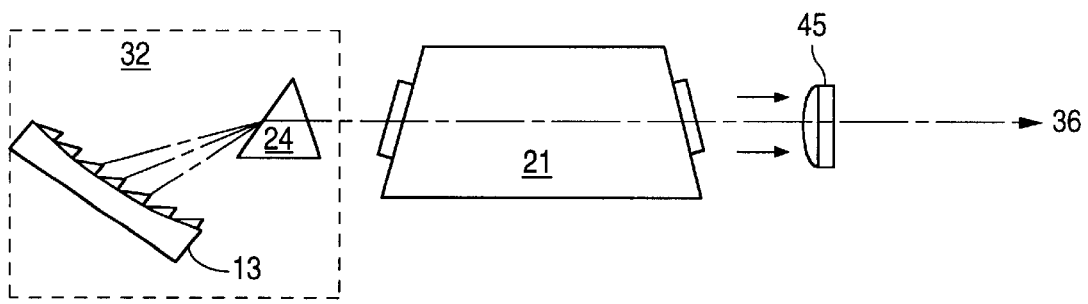
FIG. 6 shows an excimer laser arrangement according to a fifth embodiment of the present invention.

FIG. 6 shows an arrangement of a resonator of an excimer laser in accordance with a fifth embodiment of the present invention. The fifth embodiment preferably includes wavelength selection and narrowing optics 32 including the prism 4 of the first embodiment of FIG. 3, and the housing for the laser active material 1 of the first embodiment of FIG. 3. Alternatively, one or both of these elements 1, 4 may be substituted by another element disclosed in one or more other embodiments of the present invention, e.g., the second embodiment. Additionally, the fifth embodiment includes a curved grating 13 and a curved output coupling mirror 45. The two curved optical surfaces together form an unstable resonator configuration. The curvature of each element 13, 45 may be convex or concave, but preferably the output coupling mirror 45 is convex like the output coupler 15 of the first embodiment and the grating is concave, like the grating disclosed as element 40 in U.S. Pat. No. 5,095,492 to Sandstrom. Preferably, the combination of the curvatures of the output coupler 45 and the grating 13 cause the resonator of the fifth embodiment to be unstable to match the divergence for optimizing the combination of the output power, the bandwidth and the spectral purity of the output beam 36. In addition, the radius of curvature of either the grating 13 or the output coupler 45, or both, may be adjustable. The resonator of the fifth embodiment may be, and preferably is, an unstable resonator, such as that described with respect to the first embodiment.

Figure 7:
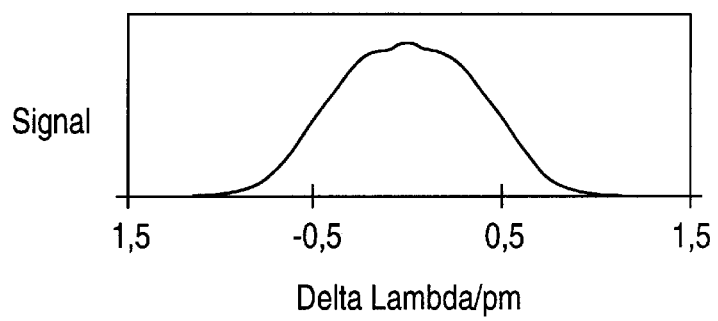
FIG. 7 shows a calculated output spectrum for the excimer laser arrangement of FIG. 1.

FIG. 7 shows a peak embodying the spectral distribution of the output beam 10 of FIG. 1. The output beam 10 is determined to have a bandwidth of 1.1 pm, calculated as the full-width at half-maximum (FWHM) of the peak of FIG. 8 embodying the spectral distribution of the output beam 10.

Figure 8:
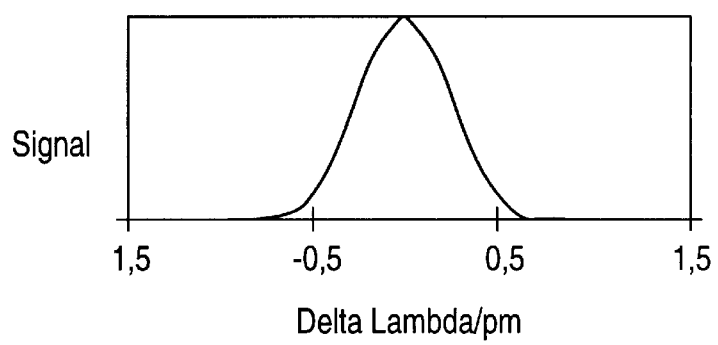
FIG. 8 shows a calculated output spectrum for the excimer laser arrangement of FIGS. 5A and 5B.

FIG. 8 shows a peak embodying the spectral distribution of the output beam 16 of FIG. 5A, wherein the optical elements of the arrangement of the third embodiment included those included in the arrangement of FIG. 1 and an aperture 19 in front of the grating 3. The aperture 19 used in obtaining the spectrum of FIG. 8 reduced the bandwidth from 1.1 to 0.5 pm by geometrically halving the divergent output beam in front of the grating 3.

Figure 9:
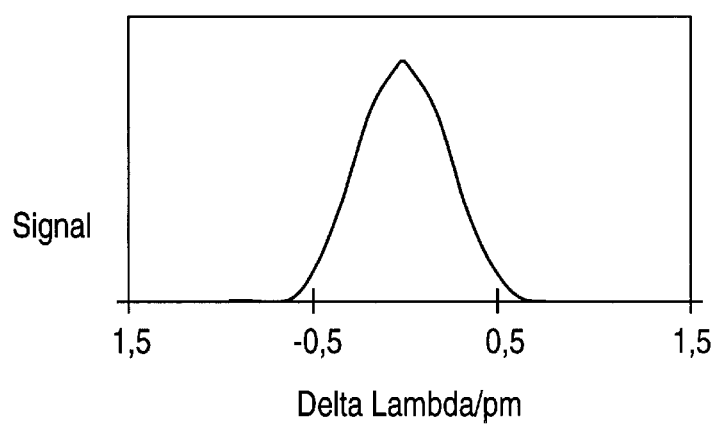
FIG. 9 shows a calculated output spectrum for an excimer laser arrangement wherein a cylindrical lens is placed between the laser active medium and a beam expander.

FIG. 9 shows a peak embodying the spectral distribution of the output beam 46 of another arrangement. An additional optical element 27 used to obtain the spectrum of FIG. 9 was a cylindrical lens, having a focal length of preferably several meters, placed between the housing for the laser active material 21 and the prism 24. The prism 24 used was a prism expander such as that described with respect to the second embodiment of FIG. 4.

Figure 10:
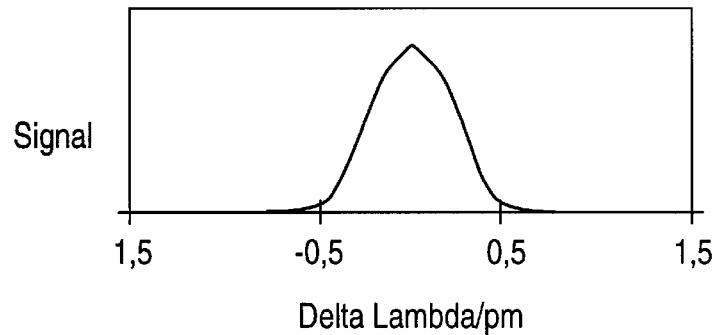
FIG. 10 shows a calculated output spectrum for the excimer laser arrangement of FIG. 3.

FIG. 10 shows a peak embodying the spectral distribution of the output beam 16 of the first embodiment of FIG. 3. The bandwidth was reduced from 1.1 to 0.5 pm by using the convex-curved output coupler 15 instead of the conventional output coupler 5 of FIG. 1.

An advantage of all of the above embodiments and improvements is that the bandwidth of the output beam of the excimer laser system to be used in microlithographic applications is reduced, while the overall laser efficiency is influenced only slightly. The reason is that only the central or principal part of the resonating beam traverses the main amplification region of the laser active medium after it has encountered one of the improved or additional optical elements of the present invention. Moreover, an improvement in spectral purity and stabilization of the beam location, pointing and exit positions is observed when one of the embodiments or improvements of the present invention is used over that of a conventional arrangement such as that shown in FIG. 1. The combination of output power, bandwidth and spectral purity is optimized by using or combining one or more embodiments of the present invention by decreasing an acceptance angle of the resonating beam and/or matching or adapting the divergence of the resonating beam.

What is claimed is:

1. A method of optimizing spectral purity, bandwidth and output power of a beam from an excimer or molecular fluorine laser including a laser active medium, a resonator, an output coupler, a processor, an energy detector, a spectrometer and a wavelength selection unit, comprising the steps of:

selecting an optical component having a curved surface and providing the optical component within the resonator for improving spectral purity;

measuring beam energy and a spectral parameter with the energy detector and spectrometer, respectively, and sending signals to the processor indicative of the beam energy and spectral parameter, and aligning the optical component within the resonator for optimizing spectral purity, bandwidth and output power of the beam based on at least one of the beam energy and spectral parameter signals sent to the processor.

2. A method of optimizing spectral purity, bandwidth and output power of a spectral beam from an excimer or molecular fluorine laser including a laser active medium, a resonator, an output coupler, a processor, an energy detector, a spectrometer and a wavelength selection unit, comprising the steps of:

selecting a refractive optical component having a curved surface and providing the refractive optical component within the resonator for adapting a divergence of the spectral beam;

measuring beam energy and a spectral parameter with the energy detector and spectrometer respectively, and sending signals to the processor indicative of the beam energy and spectral parameter; and aligning the optical component within the resonator for optimizing spectral purity, bandwidth and output power of the beam based on at least one of the beam energy and spectral parameter signals sent to the processor.

3. The method of claim 2, wherein the selecting and aligning steps cause the spectral purity to improve by between 20% and 50% and the output power to reduce by less than 10%.

4. The method of claim 3, wherein the optical component aligning step includes the step of adjusting the geometry of an aperture.

5. The method of claim 3, wherein the optical component selecting step includes selecting a radius of curvature of a surface of the optical component among a plurality of radii of curvature.

6. The method of claim 5, wherein the optical component selecting step includes selecting an optical sub-component of said wavelength selection unit.

7. The method of claim 6, wherein the optical component selecting step includes selecting a prism.

8. The method of claim 6, wherein the optical component selecting step includes selecting a reflecting surface of said resonator.

9. The method of claim 8, wherein the optical component selecting step includes selecting the output coupler having a convex radius of curvature.

10. An excimer laser, comprising an active laser medium for emitting a spectral beam;

a resonator defining an optical path intersecting said active medium;

means for output coupling the spectral beam from the resonator;

means for selecting and narrowing the wavelength of the spectral beam;

an adjustable aperture within the resonator for improving spectral purity and bandwidth; and an energy detector and a spectrometer each for receiving a portion of the spectral beam, and a processor for receiving signals from each of the energy detector and the spectrometer, wherein the adjustable aperture is adjusted when a signal is received from the processor based on information received from the spectrometer and the energy detector.

11. The laser of claim 10, wherein said spectral purity is improved by between 20% and 50% while introducing a power loss of less than 10%.

12. The laser of claim 10, wherein the aperture is located near the grating.

13. An excimer laser, comprising an active laser medium for emitting a spectral beam;

a resonator defining an optical path intersecting said active medium;

means for output coupling the spectral beam from the resonator;

means for selecting and narrowing the wavelength of the spectral beam;

an adjustable aperture within the resonator for improving spectral purity and bandwidth wherein the aperture is located near the grating, and further comprising a energy detector and a spectrometer each for receiving a portion of the spectral beam, and a processor for receiving signals from each of the energy detector and the spectrometer, wherein the adjustable aperture is automatically adjusted when a signal is received from the processor based on information received from the spectrometer and the energy detector.

14. A method of optimizing spectral purity, bandwidth and output power of a spectral beam from an excimer laser including a laser active medium, a resonator, an output coupler and a wavelength selection and narrowing means, comprising the steps of:

provviding an adjustable aperture within the resonator for adapting a divergence of the spectral beam; and adjusting the aperture for optimizing spectral purity bandwidth and output power of the beam, wherein the excimer laser further includes a spectrometer, an energy detector and a processor, and the method further comprises the step of automatically adjusting the geometry of the aperture based on a signal sent from the processor after the processor receives spectral information from said spectrometer and said energy detector.

15. The method of claim 14, wherein the selecting and aligning steps cause the spectral purity to improve by between 20% and 50% and the output power to reduce by less than 10%.

16. An excimer or molecular fluorine laser, comprising an active laser medium surrounded by a resonator and a discharge circuit for emitting a spectral beam;

a line-narrowing unit for narrowing the bandwidth of the spectral beam; and at least one optical component having a curved surface wherein the curvature is selected for improving spectral purity, and further comprising an energy detector and a spectrometer each for receiving a portion of the spectral beam, and a processor for receiving signals from each of the energy detector and the spectrometer, wherein the curvature of the curved surface of said optical component is automatically adjusted when a signal is received from the processor based on information received from the spectrometer and the energy detector.

17. The laser of claim 16, wherein the at least one optical component having a curved surface includes an output coupler.

18. The laser of claim 17, wherein the curved surface of the output coupler has a convex radius of curvature.

19. The laser of claim 16, wherein at least two optical components have curved surfaces wherein the curvatures are selected for optimizing spectral purity and bandwidth.

20. The laser of claim 16, wherein the at least one optical component having a curved surface includes a window of a chamber for housing the active laser medium.

21. The laser of claim 20, wherein the curved surface of the window has a convex radius of curvature.

22. The laser of claim 16, wherein the line-narrowing unit comprises the at least one optical component having a curved surface.

23. The laser of claim 22, wherein the at least one optical component having a curved surface is a prism.

24. The laser of claim 23, wherein the curved surface of the prism has a convex radius of curvature.

25. The laser of claim 22, wherein the at least one optical component having a curved surface further includes a window of a chamber for housing the active laser medium.

26. The laser of claim 22, wherein the at least one optical component having a curved surface is a grating.

27. The laser of claim 17, wherein the at least one optical component having a curved surface further includes a grating, wherein said grating and said output coupler form an unstable resonator.

28. The laser of claim 26, wherein the at least one optical component having a curved surface further includes an output coupler.

29. The laser of claim 28, wherein the curved surface of the output coupler has a convex radius of curvature.

30. The laser of claim 29, wherein the grating has a concave radius of curvature.

31. An excimer or molecular fluorine laser, comprising an active laser medium surrounded by a resonator and a discharge circuit including a plurality of electrodes for generating a laser beam;

a line-narrowing unit within the resonator narrowing the bandwidth of the beam; and an adjustable aperture within the resonator for improving spectral purity and bandwidth, wherein the aperture is located just in front of the grating, and further comprising an energy detector and a spectrometer each for receiving a portion of the spectral beam, and a processor for receiving signals from each of the energy detector and the spectrometer, wherein the adjustable aperture is automatically adjusted when a signal is received from the processor based on information received from the spectrometer and the energy detector.

32. An excimer or molecular fluorine laser, comprising an active laser medium surrounded by a resonator and a discharge circuit including a plurality of electrodes for generating a laser beam;

a line-narrowing unit within the resonator narrowing the bandwidth of the beam; and an adjustable aperture within the resonator for improving spectral purity and bandwidth, and further comprising an energy detector and a spectrometer each for receiving a portion of the spectral beam, and a processor for receiving signals from each of the energy detector and the spectrometer, wherein the adjustable aperture is automatically adjusted when a signal is received from the processor based on information received from the spectrometer and the energy detector.

33. The laser of claim 32, wherein said spectral purity is improved due to the adjustable aperture by between 20% and 50% while introducing a power loss of less than 10%.

34. The laser of claim 32, wherein the aperture is located just in front of the grating.

35. An excimer or molecular fluorine laser, comprising an active laser medium surrounded by a resonator and a discharge circuit for emitting a spectral beam;

a line-narrowing unit for narrowing the bandwidth of the spectral beam; and at least one optical component having a curved surface wherein the curvature is selected for improving spectral purity by between 20% and 50% while introducing a power loss of less than 10% wherein the radius of curvature of the curved surface is continuously adjustable, and further comprising an energy detector and a spectrometer each for receiving a portion of the spectral beam, and a processor for receiving signals from each of the energy detector and the spectrometer, wherein the curvature of the curved surface of said optical component is automatically adjusted when a signal is received from the processor based on information received from the spectrometer and the energy detector.

36. An excimer or molecular fluorine laser, comprising:

an active laser medium for generating a spectral beam at an original central wavelength;

a resonator including a first reflecting surface and a second reflecting surface, an optical path intersecting said active medium being defined for said resonator for generating a laser beam;

a wavelength selector for selecting a wavelength band from the spectral beam including a beam expander and a grating; and an aperture disposed between said beam expander and said grating for adapting a divergence of the resonating beam to improve and control spectral purity and bandwidth.

37. The excimer or molecular fluorine laser of claim 36, wherein the aperture is adjustable.

38. The excimer of molecular fluorine laser of claim 36, wherein the inclusion of the aperture causes the spectral purity to improve by between 20% and 50% and the output power to reduce by less than 10%.

39. An excimer or molecular fluorine laser, comprising:

an active laser medium for generating a spectral beam at an original central wavelength;

a resonator including a first reflecting surface and a second reflecting surface, an optical path intersecting said active medium being defined for said resonator for generating a laser beam;

a wavelength selector for selecting a wavelength band from the spectral beam including a beam expander and a grating;

wherein said grating, which also serves as said first reflecting surface, and said second reflecting surface have curved surfaces of opposite curvature forming an unstable resonator, and wherein said curved surface of said second reflecting surface is adjustable; and an energy detector and a spectrometer each for receiving a portion of the spectral beam, and a processor for receiving signals from each of the energy detector and the spectrometer, wherein the curvature of the curved surface of said second reflecting surface is automatically adjusted when a signal is received from the processor based on information received from the spectrometer and the energy detector.

40. The excimer or molecular fluorine laser of claim 39, further comprising an aperture disposed between said beam expander and said grating for adapting a divergence of the resonating beam to improve and control spectral purity and bandwidth.

41. The excimer or molecular fluorine laser of claim 39, wherein said second reflecting surface also outcouples the laser beam.

42. The excimer or molecular fluorine laser of claim 41, wherein the grating has a concave-curved surface, and the output coupling second reflecting surface has a convex-curved surface.

43. The laser of claim 35, wherein the at least one optical component having a curved surface includes an output coupler.

44. The laser of claim 43, wherein the curved surface of the output coupling second reflecting surface has a convex radius of curvature.

45. The laser of claim 35, wherein at least two optical components have curved surfaces wherein the curvatures are selected for optimizing spectral purity and bandwidth.

46. An excimer laser, comprising:

an active laser medium for emitting a spectral beam;

a resonator defining an optical path intersecting said active medium;

means for output coupling the spectral beam from the resonator;

means for selecting and narrowing the wavelength of the spectral beam;

an adjustable aperture within the resonator for improving spectral purity and bandwidth, wherein the aperture is located near the grating, and further comprising a energy detector and a spectrometer each for receiving a portion of the spectral beam, and a processor for receiving signals from each of the energy detector and the spectrometer, wherein the adjustable aperture is automatically adjusted when a signal is received from the processor based on information received from the spectrometer and the energy detector.

47. A method of optimizing spectral purity, bandwidth and output power of a spectral beam from an excimer laser including a laser active medium, a resonator, an output coupler and a wavelength selection and narrowing means, comprising the steps of:

providing an adjustable aperture within the resonator for adapting a divergence of the spectral beam; and adjusting the aperture for optimizing spectral purity, bandwidth and output power of the beam, wherein the excimer laser further includes a spectrometer, an energy detector and a processor, and the method further comprises the step of adjusting the geometry of the aperture based on a signal sent from the processor after the processor receives spectral information from said spectrometer and said energy detector.

48. The method of claim 47, wherein the selecting and aligning steps cause the spectral purity to improve by between 20% and 50% and the output power to reduce by less than 10%.

* * * * *

UNITED STATES PATENT AND TRADEMARK OFFICE
CERTIFICATE OF CORRECTION

PATENT NO.   : 6,285,701 B1
DATED        : September 4, 2001
INVENTOR(S)  : Hans-Stephan Albrecht, Peter Heist and Klaus Wolfgang Vogler It is certified that error appears in the above-identified patent and that said Letters Patent is hereby corrected as shown below:

<u>Title page,</u>
Under the inventors, replace "Volger" to -- Vogler --

Signed and Sealed this

Thirtieth Day of April, 2002

Attest:

Attesting Officer

JAMES E. ROGAN
Director of the United States Patent and Trademark Office